Jan. 7, 1941. C. FISCHBACH ET AL 2,227,778
TRANSPORTER SYSTEM WITH AUTOMATIC DISCHARGING
Filed Sept. 28, 1939 5 Sheets-Sheet 5
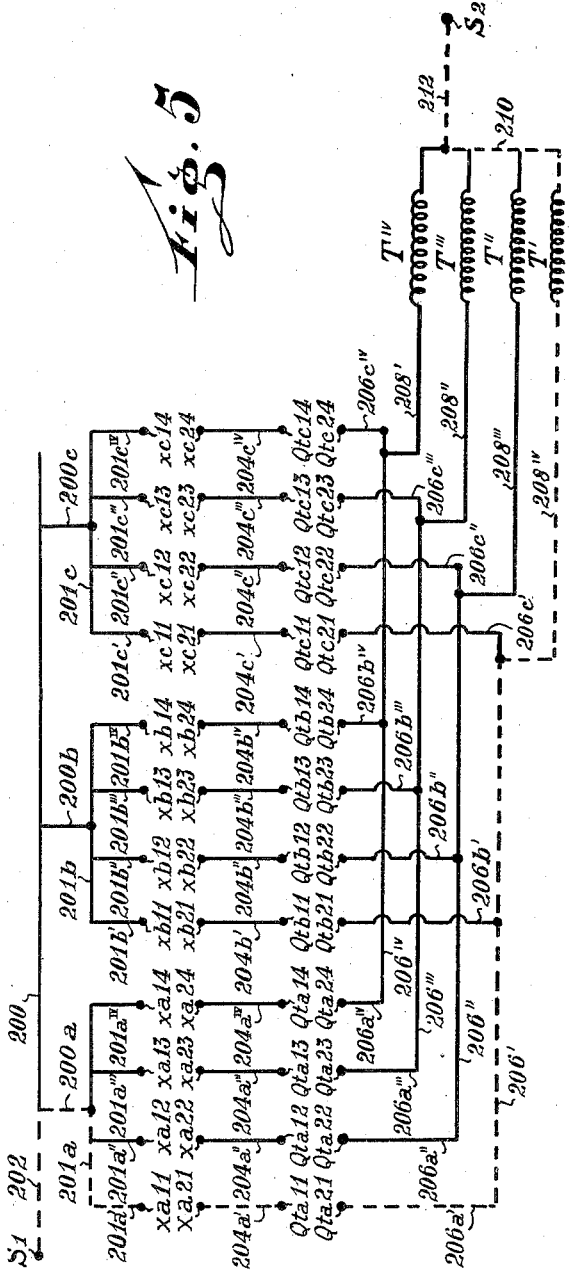
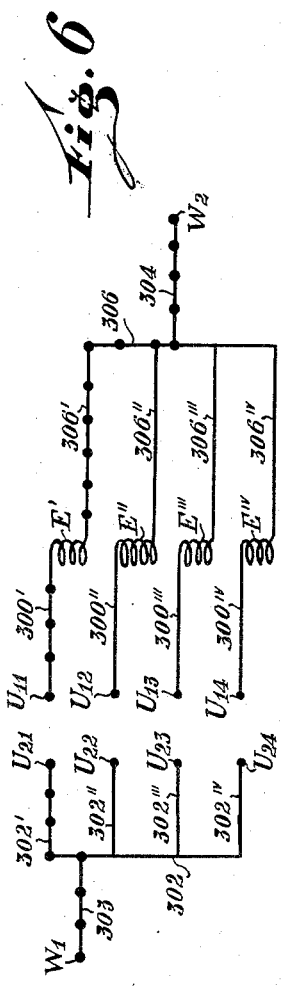
INVENTORS
C. FISCHBACH
J. ENQUIN
J. L. SIDLER
BY
*Young, Emery & Thompson*
ATTORNEYS Patented Jan. 7, 1941

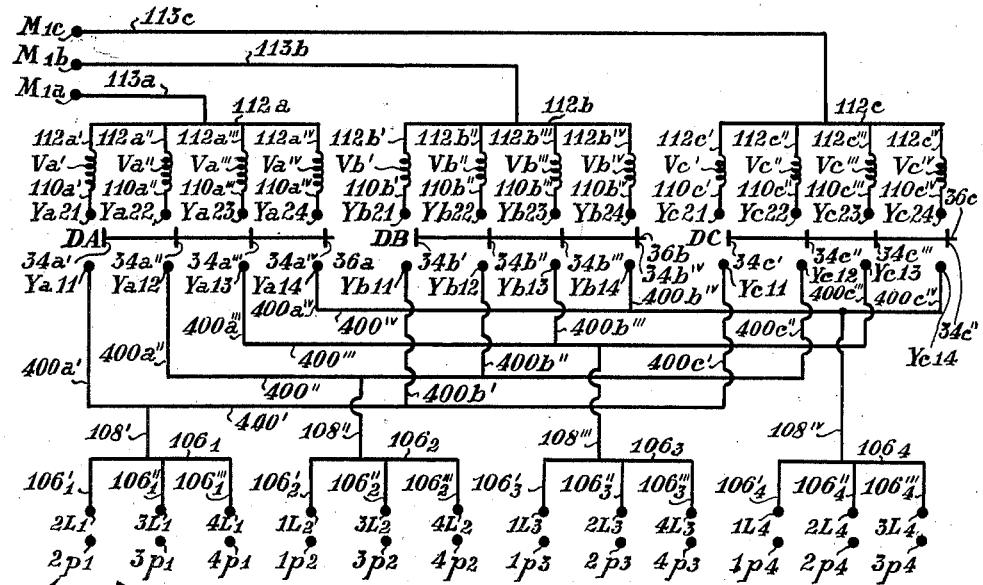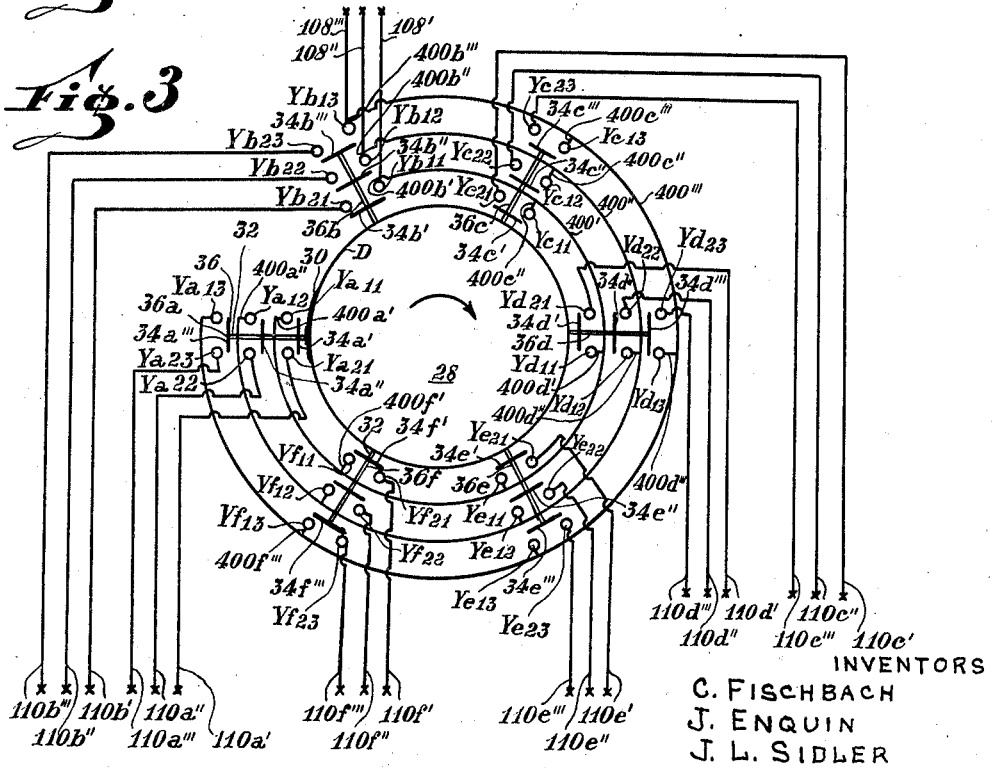

2,227,778

UNITED STATES PATENT OFFICE 2,227,778

TRANSPORTER SYSTEM WITH AUTOMATIC DISCHARGING

Carlos Fischbach, Jose Enquin, and José Luis Sidler, Buenos Aires, Argentina

Application September 28, 1939, Serial No. 296,980 In Germany October 7, 1938

5 Claims. (Cl. 214—11)

This invention relates to transporter apparatus such as conveyors, mechanical lifts and in particular to a conveyor for packages with automatic discharging at any subsequent station, preselected at the loading station.

The object of this invention is to facilitate the transport of files, packages or materials of any kind (according to individual application), either vertically or horizontally in a continuous and simultaneous manner from any number of loading stations, to any other discharge stations where the load is discharged automatically. It is especially applicable to large blocks of offices or factories, where there is considerable movement of bulky files or materials and is also suitable for various other analogous uses.

It is to be understood that it would not be feasible in practice to transport articles or materials of this kind by means of the known system of pneumatic tubes, due principally to the very limited loading capacity thereof, and furthermore to the extraordinarily high expenditure which an installation of this nature would require. Neither can the common service-lift be utilized since as many lifts would be required as there are discharge stations (for example in a 12-story building a like number of service lifts would be needed) and such an installation would, in addition to occupying considerable space, be inconvenient to manage, since for every despatch it would first be necessary to bring the lift back to the loading station.

All the disadvantages of known systems are overcome by the conveyor according to the present invention, since it has a very large loading capacity, occupies very little space, is easily controlled (because the load need only be placed in the carrier and a button be pressed to ensure automatic discharge of the load at the required point) and enables loads to be despatched simultaneously and continuously from all the loading stations, irrespective of whether all the loads are routed to the same point or each one to a different discharge station. All these advantages are obtained at a relatively low installation cost.

The conveyor of the present invention consists of an endless transporting means, vertical, horizontal or inclined, to which are attached a plurality of carriers provided with suitable tilting mechanisms operated by an arm placed near the point of discharge and controlled by an electro-magnet, the energizing circuit of which is controlled, through suitable relays from a set of push-buttons which is located near the opening of each loading station and which allows the discharge station to be preselected with the aid of a synchronized change-over device each of the rotary elements of which corresponds to a specific carrier and is provided with an actuating device which co-operates with two sets of normally open contacts, one of which is related to the push-buttons and will hereinafter be referred to as the primary set of contacts, whilst the other is associated with the circuits controlling the energization of the electro-magnets and will hereinafter be referred to as the secondary set of contacts.

Preferably, the relays connected in the circuits of the push-buttons comprise an isolation relay for each rotating element of the change-over device and a preselection and maintenance relay for each discharge station, provided with a pair of normally open contacts which are operatively associated with the energizing circuit of the isolation relay and will hereinafter be referred to as the maintenance contacts, and a second pair of normally open contacts which are operatively associated with the energizing circuit of a master relay for the corresponding discharge station, and which will hereinafter be referred to as the pair of preselection contacts. Each master relay has a pair of normally open master contacts, connected in the energizing circuit of the electro-magnet associated with the same discharge station. The energizing circuit of each isolation relay includes a maintenance line and a main line, the latter including the primary set of contacts associated with the corresponding rotary element, whilst the energizing circuit of the respective master relay includes the secondary set of contacts relating to the same rotary element.

In order clearly to understand the present invention, it must be remembered that the endless conveyor is in motion continuously and always in the same direction, so that all the carriers pass first past each loading station and then past each discharging station and at the moment when any individual carrier passes in front of any particular loading station the actuating device of the rotary element corresponding to this container, momentarily closes the primary pair of contacts of the rotary element corresponding to the aforementioned loading station and that the push-buttons at this point include one for each discharging station in the system.

Furthermore, when a particular carrier arrives at the appointed discharging station, the actuating device of the rotary element corresponding to that carrier, momentarily closes the secondary pair of contacts associated with said rotary element and corresponding to said discharging station.

Hence two things are selected, namely, the carrier to be loaded and the discharging station, and since the operative at any given loading station is in ignorance as to what discharging station has ben selected at another loading station for a given carrier arriving at said given loading station already loaded, the rule must be established that a load can only be placed in a container which arrives empty at the loading station.

For these reasons, there is provided for each rotary element of the change-over device a set of pre-selection relays comprising one for each discharging station, and the coils of all the preselection relays corresponding to any given discharging station are connected at one end to a common point which in turn is connected to the like poles of all the call-buttons for said discharging station. The group formed by said pushbutton poles will hereinafter be referred to as the call group.

The other pole of any given button of a set of push-buttons is connected to the corresponding poles of the other buttons of the same set forming a group which will hereinafter be called the actuating group. For the same reasons, one pole of each pair of contacts of the primary set which co-operates with a given rotary element is connected with the like poles of the remaining pairs associated with the same rotary element, thus forming a group which will hereinafter be referred to as the carrier identifying group, whilst the other pole of said pair of contacts of the primary set is connected to the corresponding poles of those primary pairs of contacts associated with the remaining rotary elements, which correspond to the same loading station, to form a group hereinafter referred to as the loading group. Each carrier identifying group is connected at one end to the coil of the isolation relay which is associated with the rotary element in question, and which is at the head of the corresponding set of preselection relays; and each loading group is connected to the respective actuating group.

The isolation relay has a pair of normally closed isolation contacts connected between the coil of their own relay and the carrier identifying group associated with the rotary element synchronized with the carrier corresponding to said isolation relay; so that once the isolation contacts have been opened, on energization of the relay due to depression of a push-button, the main energizing circuit of the coil of said relay is broken, and the coil continues to be energized through one of the aforementioned maintenance circuits which are entirely independent of the push-buttons and the primary sets of contacts.

In order to ensure the re-establishment of normal conditions when a carrier has travelled through a complete cycle, each rotary element is provided with a set of normally closed contacts which will be called restoring contacts, and which are connected in that part of the energizing circuit of the corresponding isolation relay, which is common to both the main energizing circuit and the maintenance circuit.

The present invention also contemplates the provision of a rotary cut-out device having normally open contacts which are interposed between the push-buttons and the coils of the preselection relays. These contacts are adapted to be closed in sets by means of a set of bridging members, electrically separated but mechanically coupled together, said set of bridging members being actuated by a rotary device with an actuating member. As many sets of contacts and bridging members are provided as there are carriers on the conveyor, and as many pairs of contacts per set, as there are discharging stations.

The present invention likewise contemplates providing, after the last discharge station reckoned in the direction of travel of the conveyor on the discharge side thereof, a fixed tipper arm to ensure that all the carriers are emptied when they reach this end of the cycle where a central department can be installed to handle mis-directed loads.

The conveyor according to the present invention may be installed as a records hoist, for transferring record files from floor to floor of a building and in that event a loading station and a discharging station, would be provided on each floor, each station consisting of suitable openings on either side of the vertical or inclined well in which the conveyor is adapted to operate. The conveyor may also be adapted to be installed horizontally and in this case the number and positioning of the discharging stations may be different from those of the loading stations.

It is to be understood that whilst the conveyor is working, the endless transporting means will be running continuously and be driven from a source of power equipped with the usual controls for stopping and starting. It is also advantageous to provide alongside each station a device for stopping the conveyor immediately in case of emergency.

As already stated, the present invention likewise includes a preferred construction of the tiltable platform for the carriers. The carrier preferably comprises a frame having two side walls in each of which an arcuate slot or groove is formed in alignment transversely of the carrier with the similar slot or groove in the opposite walls. Said slots are intended to act as a supporting guide for lateral projections on each end of the tiltable platform which may be fitted with rollers to reduce frictional resistance to a minimum.

Those skilled in the art will readily appreciate that if the carrier is provided with only one set of grooves or slots, the platform can then be tilted only in one direction. When the unloading stations are distributed along either side of the conveyor, a second pair of arcuate slots or grooves should be provided on the two sides of the carrier frame and the curvature of such second pair of slots should be directed in opposition to the curvature of the other pair. The platform will have two pairs of projections, and when it is tilted one pair of projections will remain resting at the lower extremity of the grooves or slots nearest to the discharge opening, whilst the fact that the opposite side of the container is engaged with the tipper arm of the electro-magnet of the preselected discharging station, will allow the corresponding part of the carrier frame to continue downwards and pass beyond the engaged end of the platform by reason of the presence of the other pair of curved grooves or slots. When there is only one pair of grooves or slots, it is understood that the edge of the container adjacent to the discharge opening will be hinged to the frame.

In the accompanying drawings:

Fig. 3 is a connection diagram for the cut-out device.

Fig. 5 is an ideal diagram of the connections for the control circuit of the master relays.

Fig. 6 is an ideal diagram of the energizing circuits for the electromagnets, and Fig. 7 is an ideal diagram illustrating the circuits for the cut-out device and the manner in which it is connected in the main circuits.

Figure 1:
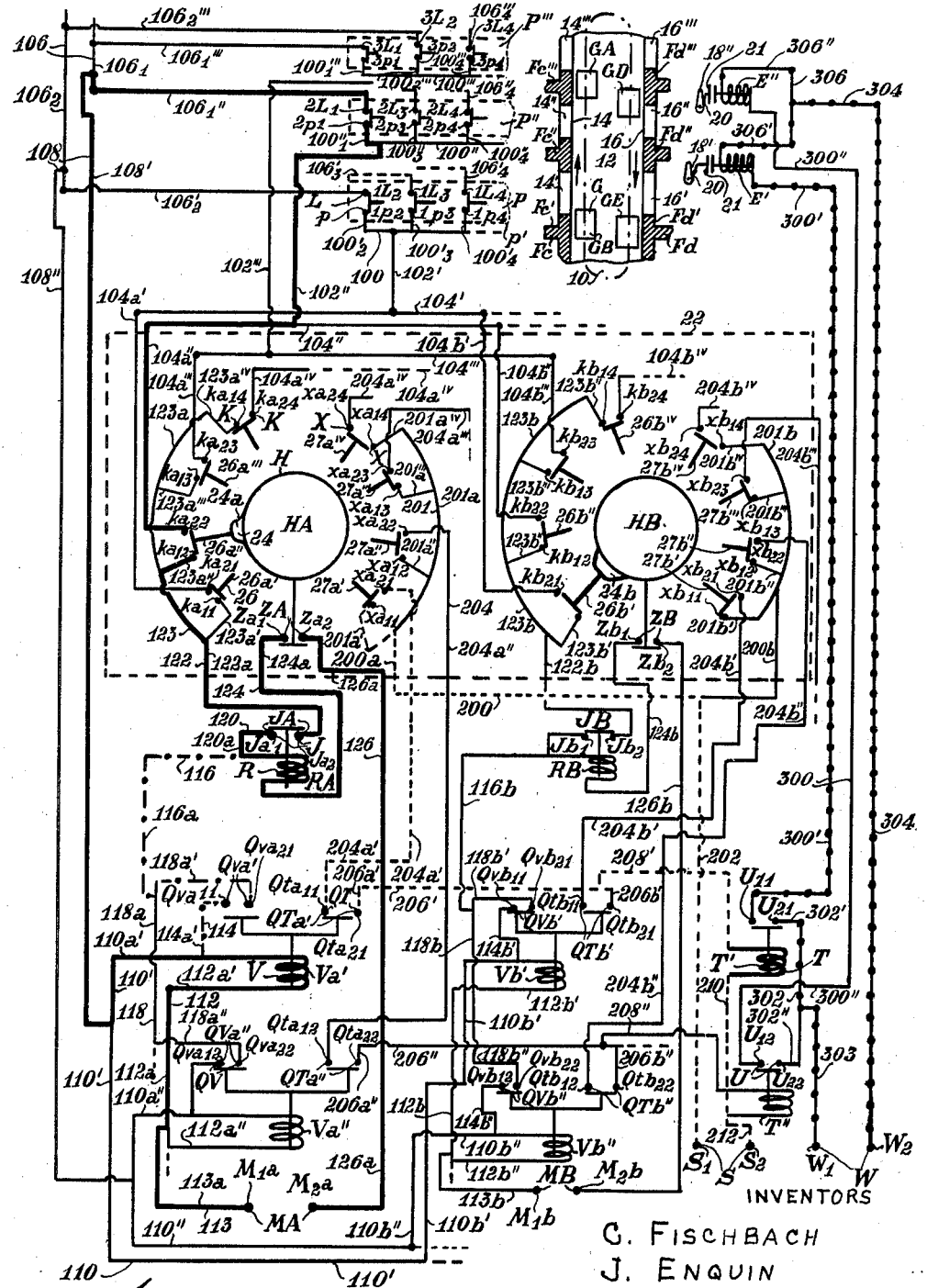
Fig. 1 is a diagram of the connections corresponding to one embodiment of the present invention.

Fig. 1 shows an embodiment of the present invention in the form of a conveyor 10, provided with a plurality of carriers GA, GB, GD and GE, and adapted to move continuously inside a vertical well 12, having a plurality of loading openings 14', 14'', and 14''', which correspond to the loading stations Fc', Fc'' and Fc''' and also a number of discharge openings 16', 16'' and 16''', corresponding to the discharging stations Fd', Fd'', and Fd'''.

For each loading station or opening 14', 14'' ... $14^n$ there is a corresponding set of push-buttons, or other similar device P', P'', P''' ... $P^n$, and at each discharging station or opening 16', 16'' ... $16^n$ there is a corresponding electromagnet E', E'' ... $E^n$, controlling a tipper arm 18', 18'' ... $18^n$ (see Fig. 2), by means of a suitable mechanism 20 which may consist of a linkwork connected to an armature 21, adapted to be attracted to the electromagnet when the latter is energized.

From the above, it can be seen that the reference system adopted in this specification is to give each element of the installation a reference character and to distinguish between identical elements located in different parts of the installation by means of identifying numbers or letters. Thus the letter G represents any individual carrier whilst the combination GA refers only to one specific container. The number 14 is used to indicate in general all openings for loading, whilst the reference 14' indicates only the opening for the first loading station. Similarly the pairs of primary contacts are indicated in general by the reference K, and those of a primary set associated with any given rotary element HA, HB ... HN are distinguished by the reference $Ka$, $Kb$ ... $Kn$. The poles of the different pairs of contacts of any sort and the terminals of the electrical power supply sources are distinguished by a subscript $_1$ or subscript $_2$. Thus the terminals of the power supply S will carry the references $S_1$ and $S_2$ respectively.

The like poles of a primary set or of a set of relays for similar purposes, will be identified furthermore by a number referring to the floor to which they belong and placed after the subscript number for distinguishing the poles. Thus the reference $ka_{23}$ indicates the pole 2 of the pair of primary contacts K associated with the rotary element HA and referring to the third (loading) station. In all remaining cases the individual loading or unloading stations are referred to by the use of dashes; thus $26a'''$ refers to an element 26 related with the rotary element HA and associated with the third (loading) station. With this explanation, it is believed that hereinafter the generic references may be used when referring generally to the respective elements, whereby the explanation and understanding of the invention will be simplified and unnecessary repetitions avoided.

Continuing with the detailed description, as already stated, the installation consists of a changeover device 22 synchronized with the conveyor 10 and provided with a number of rotary elements H, corresponding in number to the carriers G. Each of these rotary elements HA, HB, corresponds respectively to a specific carrier GA, GB and is provided with an actuating device 24 adapted to co-operate with a plurality of closing elements 26, to close successively and momentarily the poles $k_1$, $k_2$, $x_1$, $x_2$ and $z_1$, $z_2$, of a plurality of pairs of contacts K, X, Z distributed around each rotary element. These contacts are divided into three sets, that is to say: a primary set consisting of as many pairs of contacts as there are loading stations, which are identified by the letter K; a secondary set which consists of as many pairs of contacts as there are unloading stations, which are distinguished by the letter X; and a third set consisting of a single pair of contacts Z which are the restoring contacts already mentioned.

The installation also includes an isolating relay R for each rotary element H, that is to say, for each carrier G, and a number of preselection and maintenance relays V corresponding in number to the unloading stations.

The isolating relay R has a pair of normally closed contacts J connected in the main circuit of the isolating relays and of the preselection and maintenance relays V of the corresponding set. These preselection and maintenance relays V are each provided with a pair of maintenance contacts QV and a pair of preselection contacts QT, both pairs of contacts being normally open and the preselection contacts being connected in the energizing circuit of a master relay T, which is provided with only one pair of contacts U which normally break the energizing circuit of the corresponding electromagnet E.

Independent sources M, S, W of electric power are provided for each set of preselection and maintenance relays V and the corresponding isolating relay R, for the set of master relays T, and for the set of electromagnets E, respectively.

Before entering into a general description of the electric circuits, reference should be made to certain groupings of the various elements which must be formed in order for the system to work correctly.

Thus, for example, a pole $k_1$ of the pair of contacts K of the primary set associated with a given rotary element H is connected to the corresponding poles of the remaining pairs of contacts of the same set, forming a carrier identifying group, for example the group $ka_{11}$, $ka_{12}$, $ka_{13}$, $ka_{14}$; whilst the other pole $k_2$ of this same pair of contacts K is connected with the similar pole of the corresponding pairs of contacts of the remaining primary sets to form a loading group; for example, the group $ka_{21}$, $kb_{21}$, $kc_{21}$. Similarly a pole $x_1$ of a pair of contacts X of the secondary set associated with a given rotary element H, is connected to the corresponding poles of the remaining pairs of contacts of the same secondary set, forming a carrier selection group, for example, the group $xa_{11}$, $xa_{12}$, $xa_{13}$, $xa_{14}$.

Each push-button of any given set P has one pole $p$ connected to the corresponding poles of the remaining push-buttons of the same set, to form an actuating group; for example the group $lp_2$, $lp_3$, $lp_4$, and one pole L connected with the similar pole of the corresponding push-buttons of the remaining sets, to form a call group, such as the group $1L_2$, $3L_2$.

Figure 4:
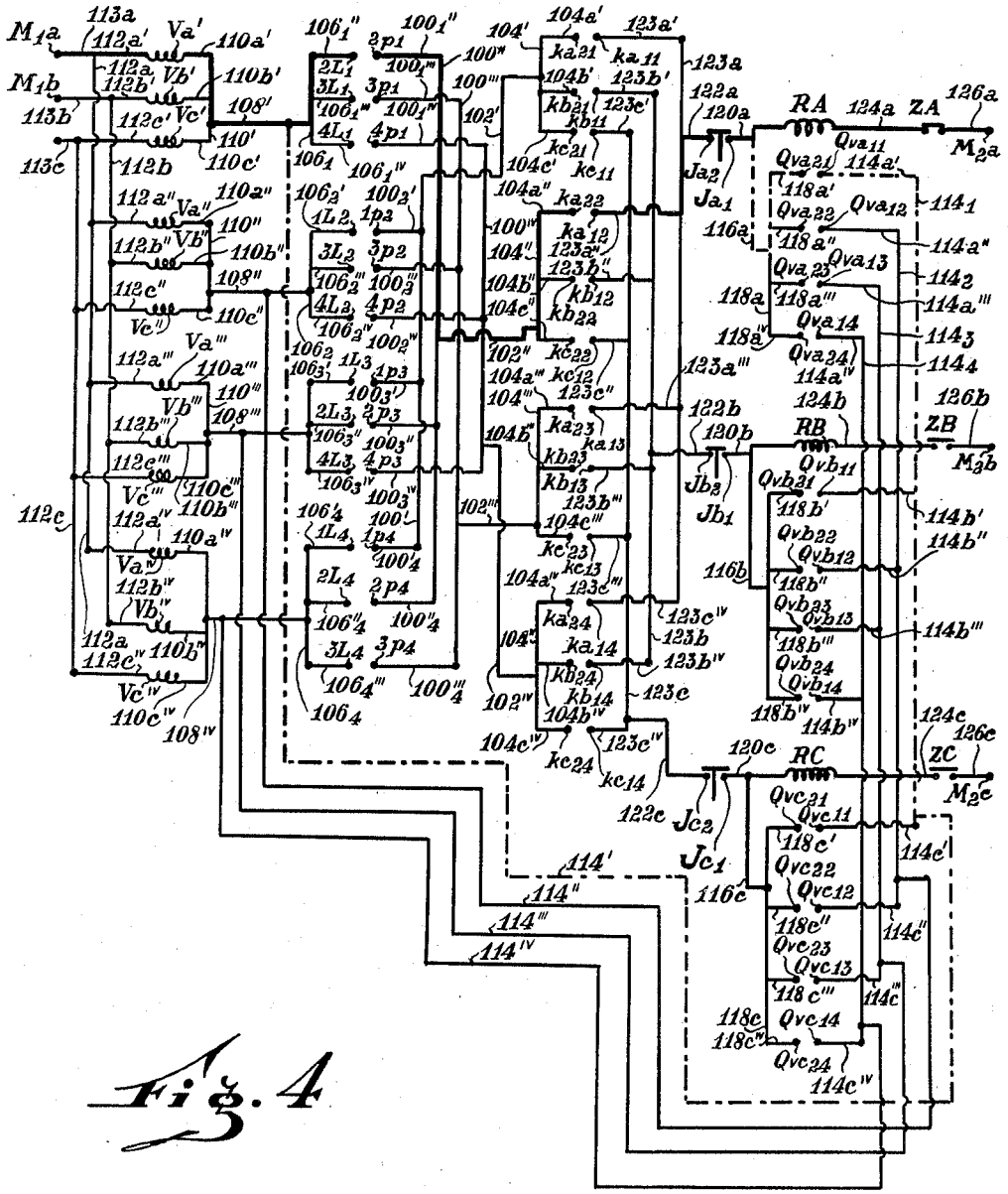
Fig. 4 is an ideal diagram of the connections for the preselection circuit of Fig. 1, in which the various electrical portions have been shown in their corresponding groups.

This grouping of the units can be more clearly seen in Figures 4, 5 and 6 which also show that the coils of the master relays T form a parallel group, the individual branches of which are connected with the respective carrier selection groups formed by the contacts X, and that the coils of the electromagnets E also form a parallel group, the branches of which are connected individually to the poles $U_1$ of the master relays, the other poles $U_2$ of which form another parallel group connected to one terminal of the respective electric power supply W.

Returning to Figure 1, in which for the purpose of clarity only a few of the essential circuits have been completely shown, it will be noticed that the actuating groups of the push-button poles are formed by means of a conductor 100 with its branches $100_n$, i. e. by means of the conductors 100', 100'', 100''' for the first, second and third loading stations $F_c'$, $F_c''$ and $F_c'''$ with their respective branches $100_2'$, $100_3'$, $100_4'$, $100_1''$, $100_3''$, $100_4''$, $100_1'''$, $100_2'''$ and $100_4'''$; and that each of these actuating groups is joined to the loading group of the primary contacts K, by means of a conductor 102 that is, by means of the conductors 102', 102'' and 102'''; the said loading groups being formed by a conductor 104 with its branches $104_x$, the individual reference characters following the system already explained. Thus, the loading groups which refer to the first and second loading stations are formed by means of the conductors 104' and 104'', with their respective branches $104_a'$, $104_b'$, $104_a''$ and $104_b''$.

The call-groups L of the push-buttons are formed by means of conductors 106 (for example $106_1$, $106_2$) and their branches $106n^p$ (for example $106_1''$, $106_1'''$, $106_2'$ and $106_2'''$) and are connected by means of the conductors 108 (in the example, 108', 108'') to the respective groups formed by connecting together the corresponding ends of the coils of the preselection relays V relating to the same unloading stations. These groups of coils are formed by conductors 110 (110', 110'') and their respective branches $110_x$ ($110_a'$, $110_b'$ and $110_a''$, $110_b''$) in such a manner that a given group of these coils includes all the preselection and maintenance relays which are associated with the same discharge station, and which are related one by one with the several rotary elements HA, HB . . . HX. Thus one group consists of the relays $Va'$, $Vb'$, i. e. the preselection relays of the first discharging station, associated with the rotary elements HA, HB, respectively. Similarly another of these groups consists of the relay coils $Va''$, $Vb''$, corresponding to the second discharge station. The other ends of the preselection relay coils of a set relating to the same rotary element, are connected in parallel through conductor 112 and its branches $112_x^n$ (i. e. the conductors $112a$ or $112b$ and the branches $112a'$, $112a''$, and $112b'$, $112b''$ respectively) and each parallel group is linked by means of a conductor 113 to a terminal (for example, the terminal $M_1$) of the corresponding electrical power supply M.

That end of the coils V forming part of the group connected to the respective call group, is connected also to a pole $Q_v$, for example the pole $Q_{v_1}$ of the pair of maintenance contacts QV associated with the preselection and maintenance relay in question, by means of a conductor 114. Thus the said end of coil $Va'$ is connected by conductor $114a'$ to pole $Qva_{11}$ of the pair of contacts $QVa'$; and the end of the coil $Va_2$ is connected by conductor $114a''$ to pole $Qva_{12}$ of the pair of contacts $QVa''$, whilst the same end of the coil $Vb'$ is connected by conductor $114b'$ to pole $Qvb_{11}$ of the pair of contacts $QVb'$, and the end of the coil $Vb''$ is connected by conductor $144b''$ to pole $Qvb_{12}$ of the pair of contacts $QVb''$.

The other pole $Qvx_{2n}$ of the pair of maintenance contacts QV of a given preselection relay V, is connected in parallel by conductors 118 and the branches $118x^n$ with the corresponding poles $Qvx_{2n}$ of the remaining pairs of maintenance contacts of the same set of preselection relays and each parallel group of said contacts $Qvx_{2n}$, is connected by conductor 116 to one end of the coil of the isolating relay R, which corresponds to the set of preselection relays and to the rotary element in question.

Thus the poles $Qva_{21}$ and $Qva_{22}$ of the relays $Va'$ and $Va''$ corresponding to the first and second unloading stations and forming the set relating to the rotary element HA and hence to the carrier GA, are connected in parallel by means of conductor $118a$ and its respective branches $118a'$, $118a''$. Similarly, the conductor $118b$ and the branches $118b'$ and $118b''$ connect in parallel the poles $Qvb_{21}$ and $Qvb_{22}$ of the relays $Vb'$ and $Vb''$. The first group is connected by a conductor $116a$ to one end of the coil of the relay RA, and the second group is connected by conductor $116b$ to one end of the relay coil RB.

The said end of the isolating relay R is connected likewise, by conductor 120 to one pole $J_1$ of the pair of normally closed contacts J of said isolating relay, whilst the other pole $J_2$ of said pair of contacts is connected by conductor 122, to the carrier identifying group formed by the poles K, associated with the respective rotary element H.

In the diagram, said end of the coil RA is connected by conductor $120a$ to the pole $Ja_1$ of the contacts JA of relay RA; whilst the other pole $Ja_2$ is connected by conductor $122a$, to the carrier identifying group $Ka$. Similarly, the respective end of the coil RB is connected by conductor $120b$, to pole $Jb_1$ and pole $Jb_2$ is connected by conductor $122b$, to the carrier identifying group $kb$.

The other end of the coil of said isolating relay R is connected across the restoring contacts Z, to the other terminal $M_2$ of the respective electric power supply, by conductors 124 and 126. Thus the other end of the relay RA is connected by conductor $124a$, to pole $Za_1$, and pole $Za_2$ is connected by conductor $126a$, to terminal $M_{2a}$ of the supply MA. The corresponding end of the relay RB is connected by conductors $124b$ and $126b$, through the poles $Zb_1$ and $Zb_2$ to the terminal $M_{2b}$ of the power supply MB.

These connections complete the primary control circuits; that is to say, those circuits which relate to the push-buttons and primary sets of contacts associated with the rotary elements, and which serve to carry out the preselection in a manner which will be described later.

As has already been indicated, the poles $x_1$ of the pairs of contacts X of the secondary set associated with a rotary element H are connected in parallel by a conductor 201 and its branches $201x^n$, to form a carrier selection group. Thus the poles $xa_{11}$, $xa_{12}$, $xa_{13}$ and $xa_{14}$, of the set XA associated with the rotary element HA, are connected in parallel by conductor $201a$ and its branches $201a'$, $201a''$, $201a'''$ and $201a''''$; and poles $xb_{11}$, $xb_{12}$, $xb_{13}$ and $xb_{14}$ of the set XB are connected in parallel by conductor $201b$ with its branches $201b'$, $201b''$, $201b'''$ and $201b''''$.

These carrier selection groups are connected to each other in parallel by a conductor 200 and its branches $200x$, and the combination of these groups thus formed is connected to a terminal $S_1$ of a separate power supply S, through the conductor 202. The other poles $x_2$ of each secondary set X are connected individually to one of the poles $Qt_1$ of the preselection contacts QT of the corresponding preselection relays V by conductors 204. The other poles $Qt_2$ of the preselection contacts QT of the preselection relays V corresponding to each set are connected in parallel by conductors 206 and their corresponding branches $206x^n$, and the groups thus formed are connected by a conductor 208, to one end of the coils of the respective master relays T, whilst the other end of said coils T are connected in parallel by conductor 210, which is connected in turn with the other pole $S_2$ of the separate power supply, by conductor 212.

In this manner, the group formed by the poles $xa_{11}$, $xa_{12}$, $xa_{13}$ and $xa_{14}$ of the secondary contacts XA of the rotary element HA, is connected in parallel by conductor 200 and its branches $200a$, $200b$, with the group formed by the poles $xb_{11}$, $xb_{12}$, $xb_{13}$ and $xb_{14}$, of the secondary contacts XB of the rotary element HB, and connected to the terminal $S_1$ of the power supply S, by the conductor 202. The pole $xa_{21}$ is connected by conductor $204a'$ to the pole $Qta_{11}$ of the preselection contacts of the preselection relay $Va'$ corresponding to the first discharging station and included in the set related with the rotary element HA. In like manner are connected also the pole $xa_{22}$ to the pole $Qta_{12}$ by conductor $204a''$; the pole $xb_{21}$ to the pole $Qtb_{11}$ by conductor $204b'$; and the pole $xb_{22}$ to the pole $Qtb_{12}$ by conductor $204b''$.

The pole $Qta_{21}$ of the preselection contacts of the preselection relay $Va'$ is connected in parallel through the conductor $206'$ and its branches $206a'$, $206b'$, with the corresponding pole $Qtb_{21}$ of the preselection relay $Vb'$ and the group thus formed is connected by conductor $208'$ to one end of the master relay coil $T'$, the other end of which is connected by conductor 210 in parallel with the corresponding end of the master relay coil $T''$, this group being connected by conductor 212, to the other terminal $S_2$ of the power supply S. Similarly the poles $Qta_{22}$ and $Qtb_{22}$ are connected in parallel through the conductor $206''$ and its branches $206a''$, $206b''$ and connected to the corresponding end of the master relay coil $T''$, by the conductor $208''$.

These connections complete the preselection translation circuits, that is to say, those circuits which control the energizing circuits of the electromagnets. These latter circuits comprise the contacts U of the master relays T. One pole of these contacts, for example, the pole $U_1$, is connected directly by conductor 300, to one end of the winding E of the electromagnet associated with the discharge station corresponding to the master relay T; whilst the other pole $U_2$ of these contacts is connected in parallel to the corresponding poles of the remaining master relays, by conductor 302 and its branches $302^n$; the group thus formed being connected through conductor 303, to one contact $W_1$ of a main power supply W, the other terminal $W_2$ of which is connected by conductor 304 to a parallel group of the other ends of the windings E, this group being formed by conductor 306 and its branches $306^n$.

Thus one end of the winding $E'$ is connected to the terminal $W_2$ of the power supply W through conductors $306'$, 306 and 304 and the other end of said winding is connected by conductor $300'$ to the pole $U_{11}$ of the master relay $T'$, the other pole $U_{21}$ of which is connected by conductor 302 and its branches $302'$, $302''$, in parallel with the corresponding pole $U_{22}$ of the master relay $T''$, and connected by conductor 303 to the contact $W_1$ of the power supply W. One end of the electromagnet winding $E''$ is connected to the pole $W_2$ of the power supply W, by conductors $306''$, 306 and 304, whilst the other end of said winding $E''$ is connected by conductor $300''$ to the pole $U_{12}$ of the master relay $T''$. The connections of the other pole of this relay $T''$ have already been described.

The system of connections which has now been explained is all that is required so far as the electrical portion is concerned for the operation of the automatic conveyor. Nevertheless, certain difficulties may arise should simultaneous calls chance to be made from two different loading stations. To overcome this difficulty a cut-out device D is provided as shown diagrammatically in Fig. 3, the connections of which are shown in simplified form in Fig. 7.

The cut-out device D consists of a rotary member 28 provided with an actuating device 30 adapted to co-operate successively with each of a plurality of contact closing elements 32, consisting of a number of bridge members 34, equal to the number of discharging stations, whilst the number of closing elements is equal to that of the carriers. The bridge members 34 of each closing element 32 are mechanically coupled together by means of a coupling member 36, but are electrically insulated from each other, and each bridge member is adapted to co-operate with a pair of normally open contacts Y of which one pole $Y_1$ is connected by a conductor 400 and its branches $400x^n$, in parallel with the similar poles of the remaining pairs of contacts Y corresponding to the same discharging station. Thus the pole $Ya_{11}$ of the set of contacts YA is connected in parallel with the poles $Yb_{11}$, and $Yc_{11}$ of the sets YB and YC, by conductor $400'$ and its branches $400a'$, $400b'$ and $400c'$, whilst the pole $Ya_{12}$ of the set YA is connected to the corresponding poles $Yb_{12}$ and $Yc_{12}$ of the remaining sets, through conductor $400''$ and its branches $400a''$, $400b''$ and $400c''$, and so on, similarly for the poles $Ya_{13}$ etc.

As already indicated the cut-out device should be connected between the preselection relay coils and the push-button corresponding to the same discharge station. This connection is as shown in Fig. 7 effected by connecting the other poles $Y_2$ individually to the side of the corresponding preselection relay coil V remote from the terminal of the respective power supply. For these connections the $110x^n$ branches already mentioned, can be employed. Each parallel group of the first poles $Y_1$ is connected to the corresponding call group, of the poles of the push-buttons, by conductors $108^n$, $106^n$ and $106x^n$.

Thus, for example, the pole $Ya_{21}$ is connected to the end of the relay coil $Va'$, by conductor $110a'$ and the poles $Ya_{22}$, $Ya_{23}$, $Yb_{21}$, $Yb_{22}$, $Yb_{23}$, $Yc_{21}$, $Yc_{22}$, $Yc_{23}$, are connected to the ends of the relay coils $Va''$, $Va'''$, $Vb'$, $Vb''$, $Vc'$, $Vc''$, $Vc'''$, by conductors $110a''$, $110a'''$, $110b'$, $110b''$, ... $110c'''$, respectively. The group formed by the poles $Ya_{11}$, $Yb_{11}$ and $Yc_{11}$ is connected by conductors $108'$, $106'$ and their branches, to the call group formed by the poles $2L_1$, $3L_1$ and $4L_1$ of those buttons in the sets $P''$, $P'''$ and $P''''$ which are utilized for calling the first discharging station, and the group consisting of the poles $Ya_{12}$, $Yb_{12}$ and $Yc_{12}$, is connected by conductors $108''$, $106''$ and their branches, to the call group for the second discharging station formed by the poles $1L_2$, $3L_2$, $4L_2$.

Thus, when the poles Y, corresponding to the preselection relays associated with a rotary element H, that is, with a given carrier G, are closed all the remaining poles Y are open, and since a carrier G can at any given moment be in front of only one loading station, it follows that it is possible from this loading station only to call the discharging station to which it is intended to send the package. At this particular moment depressing a push-button at another loading station has no effect, since the contacts Y in the circuit of the preselection relays associated with the carrier which is in front of said other loading station, are open. In practice, the pressing of a call push-button requires more than a mere second, and if the rotary member 28 of the cut-out device rotates at such a speed that every second the same set of contacts Y is closed, there will be sufficient time to establish the two preselection circuits successively even though the two push-buttons were depressed simultaneously, while at the same time it is impossible for the two preselection circuits to cross each other, as might otherwise occur.

Figure 2:
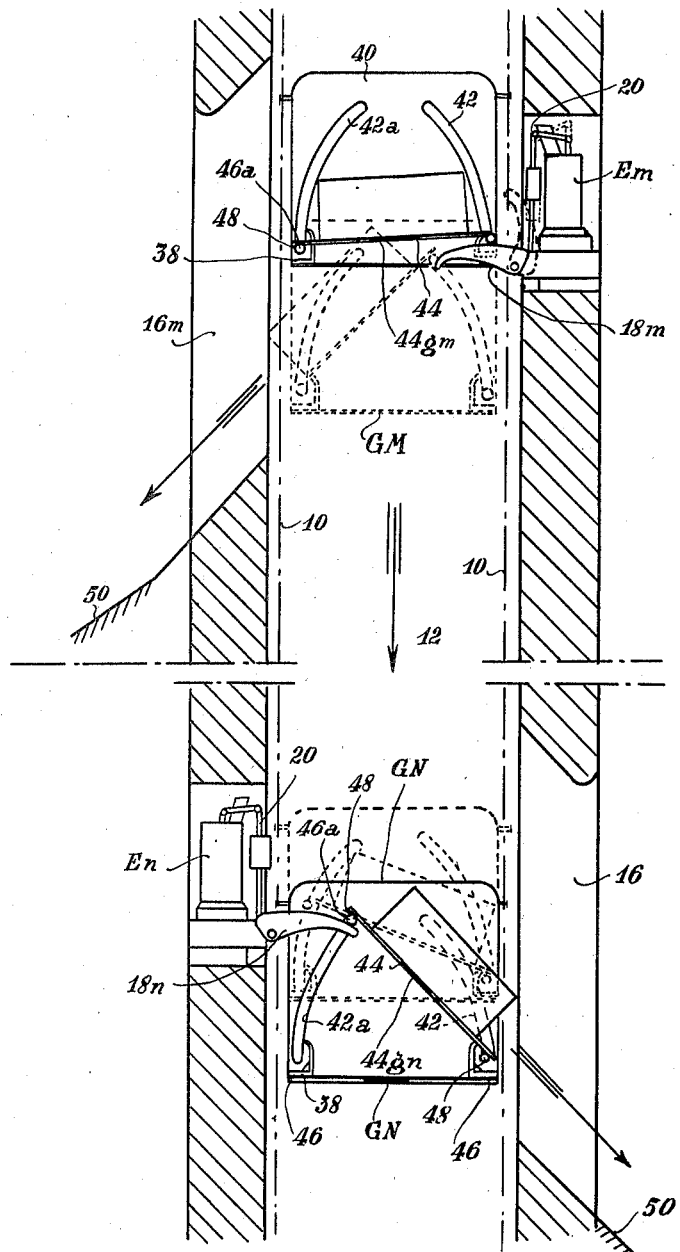
Fig. 2 is a longitudinal section of the well of a conveyor showing the preferred construction of the carriers with their tiltable platforms.

In Fig. 2 two carriers GM and GN are shown diagrammatically, the former in the actual moment of reaching the tipper arm 18m associated with the electromagnet $E^m$ of one of the discharging stations, and the latter at the moment when it is about to pass beyond the tipper arm 18n associated with the electromagnet $E^n$ of an unloading station facing the opposite direction to that of the station corresponding to the electromagnet $E^m$.

As already explained, each carrier consists of a frame 38 having two side walls 40, in each of which are two arcuate grooves or slots 42, 42a, so arranged that the concavity thereof faces the discharging side which is next to the edge of the carrier remote from the groove in question. Thus, in Fig. 2, the groove 42 corresponds to the discharge openings on the left and the groove 42a refers to the discharge openings on the right of the well 12.

Each carrier has also a tiltable platform 44 on which the packages are placed (or for example trays containing letter files). This platform is provided at either end with two projections 46, which fit into the grooves 42, 42a and normally lie at rest at the lower end thereof. These projections can be the ends of small rods secured to the underside of the tiltable platform, and can be provided with rollers 48 to minimise friction and prevent lateral oscillation.

If all the discharge openings are on the same side of the conveyor wall, then the superfluous groove may be omitted, and the tiltable platform may be hinged to the frame along the edge adjacent the unloading side.

When platform 44 arrives at a tipper arm 18 which has been lowered into position due to energization of the corresponding electromagnet, the downward movement of one edge of the platform is arrested as it comes in contact with said arm, whilst the other edge continues downwards on its travel responsive to gravity and the additional weight of the load; thus the platform is tilted towards the discharging side where a suitable chute 50 can be provided to direct the load to a receiving table (not indicated).

During these movements the pair of projections 46a, which co-operates with the slots 42a on the side nearest the discharge opening, act as a hinge pin allowing the frame to continue downwards beyond the arrested edge of the carrier.

The operation of the electrical part of the system will now be described and to this end the circuits to be established in relation to carriers GA and GB, will be described on the supposition that carrier GA is loaded at the second loading station with a package intended for the first unloading station, and that the carrier GB is loaded at the first loading station with a package to be discharged at the second unloading station. For clarity, heavy lines have been used in Figs. 1, 4, 5 and 6 to indicate the three circuits which cooperate to energize the respective electromagnet.

When the carrier GA reaches the opening of the second loading station $Fc''$, the operator places the package on the platform 44ga, and presses the push-button corresponding to the first discharging station, thus closing momentarily the poles $2L_1$ and $2p_1$ of the push-button set $P''$. At this instant, the actuating device 24a carried by the rotary element HA, is in contact with the closing element $26a''$ corresponding to the loading station $Fc''$, which on being moved by the actuating device, connects the pole $ka_{12}$ to the pole $ka_{22}$, of the primary set of contacts relating to the rotary element HA. Since there is only one actuating device for each rotary element HA all the remaining pairs of contacts will remain open. Consequently, on depressing the push-button of the first discharging station $Fd'$, only one particular circuit is established (indicated by the heavy line) from pole $2L_1$ by the conductors $106_1''$, $106_1$, $108'$, $110'$ and $110a'$, the preselection relay coil $Va'$ of the set associated with the rotary element HA, conductors $112a'$, $112a$ and $113a$, terminal $M_{1a}$ of the power supply MA, and from the other terminal $M_{2a}$, by conductor $126a$, the pair of restoring contacts ZA, conductor $124a$, the coil of the isolating relay RA associated with the rotary element HA, conductor $120a$, poles $Ja_1$ and $Ja_2$ of the pair of contacts of said relay, conductors $122$, $123a$ and $123a''$, poles $ka_{12}$ and $ka_{22}$ of the primary set of contacts KA associated with the rotary element HA, the conductors $104a''$, $104''$, $102''$, $100''$ and $100_1''$, to pole $2p_1$ of the push-button which has been depressed. Thus the relay coils RA and $Va'$ are energized simultaneously.

When relay RA responds, the bridge is retracted from the poles $Ja_1$ and $Ja_2$, thus breaking the main energizing circuit which includes the poles $2L_1$ and $2p_1$ of the call button for the first discharging station and as the poles L of all the push-buttons are connected in a certain number of call groups, each of which is connected in series with the contacts JA, at the moment when closure occurs of the pair of contacts KA of the primary set which corresponds to the rotary element HA (that is to say: to the carrier GA) it follows that, once a preselection has been made for this container it is impossible to make a subsequent preselection from any other loading station whilst the relay coil RA continues to be energized.

When the preselection and maintenance coil $Va'$, which serves to preselect the first unloading station, is energized, an alternative energizing circuit is established for the relay coils RA and $Va'$, the essential parts of which are indicated by the heavy chain line and which runs from the terminal $M_{1a}$ of the power supply MA, by conductors $113a$, $112a$ and $112a'$, the relay coil $Va'$, the conductor $114a'$, the poles $Qva_{11}$ and $Qva_{21}$ of the maintenance contacts of the relay $Va'$, conductor $118a'$, $118a$ and $116a$, the coil of the isolating relay RA, conductor $124a$, the restoring contacts ZA and conductor $126a$ to the contact $M_{2a}$ of the power supply MA.

Thus, it can be seen that the function of the relay R is to isolate the preselection circuits associated with any given rotary element, from the push-buttons and also from the primary sets of contacts; and that the relay R will remain energized and consequently will prevent any other preselection for the same carrier until such time as the maintenance circuit, which has just been explained, is broken. This will take place when the carrier reaches the end of its double path and is again about to pass the loading stations, because the actuating device 24 of the rotary element in question will have opened the corresponding restoring contacts Z.

When the preselection relay $Va'$ is energized it closes at the same time the preselection contacts QT, thus preparing for the master relay T' of the electromagnet corresponding to the first unloading station $Fd'$, and energizing circuit which is only completed when the carrier GA reaches said unloadnig station; and which has been indicated by a heavy broken line.

This energizing circuit for the relay T' comprises one pole $xa_{21}$ of that pair of contacts XA of the secondary set of the rotary element HA, which corresponds to the first discharging station, conductor 204a', the preselection poles $Qta_{11}$ and $Qta_{21}$, conductors 206a', 206', 208', the relay coil T', conductors 210, 212, the terminals $S_2$ and $S_1$ of the electric power supply S, conductors 202, 200, 200a, 201a and 201a', and the other pole $xa_{11}$ of the aforementioned pair of contacts XA of the secondary set relating to the rotary element HA. This pair of contacts remains open until the actuating device 24a of the rotary element HA reaches the closing element 27a', which occurs only when the carrier GA is approaching the discharging opening of the station $Fd'$. At this moment, the energizing circuit for the relay T' is closed and the latter immediately closes the contacts U, completing the power supply circuit to the electromagnet E'. This circuit is represented by a heavy unbroken dotted line which runs from the pole $U_{11}$ by conductor 300', the winding of the electromagnet E', conductors 306', 306 and 304 to the terminal $W_2$ of the main power supply W, and from the terminal $W_1$ of said power supply by conductors 303, 302 and 302' to the other pole $U_{21}$ of said pair of contacts.

Energization of the electromagnet E' causes arm 18' to move into a position to arrest the corresponding edge of the tiltable platform 44a of the carrier GA which unloads its contents in the manner already described.

The remaining preselection circuits are established in a similar manner, excepting that the isolating relays and preselection relays corresponding to the carrier and unloading station in question will enter into play. Thus, for example, if at the moment when the carrier GB passes the opening of the first loading station Fc', the button corresponding to the second discharging station is pressed, an energizing circuit is established for the relay coils RB and Vb'', which comprises the pole $1La$ of the call button for the second loading station in the push-button set P', the conductors $106_2'$, $106_2$, 108'', 110'', 110b'', the relay coil Vb'', conductors 112b'', 112b, 113b, the terminals $M_{1b}$ and $M_{2b}$ of the power supply MB, conductor 126b, the restoring contacts ZB, conductor 124b, the relay coil RB, conductor 120b, contacts JB, conductors 122b, 123b and 123b', poles $kb_{11}$ and $kb_{21}$, conductors 104b', 104', 102', 100' and $100_2'$ and the pole $1p_2$ of the push-button in question.

The maintenance circuit in this case will comprise the terminal $M_{1b}$ of the power supply MB, conductors 113b, 112b, 112b', the relay coil Vb'', conductor 114b', poles $Qvb_{12}$ and $Qvb_{22}$, conductors 118b'', 118b and 116b, the winding of the relay RB, conductor 124b, contacts ZB, conductor 126b and the other terminal $M_{2b}$ of the power supply MB.

The preselection circuit includes terminal $S_1$ of the power supply S, the conductors 202, 200, 200b, 201b, and 201b'', poles $xb_{12}$ and $xb_{22}$, conductor 204b'', poles $Qtb_{12}$ and $Qtb_{22}$ of the relay Vb'', conductors 206b'', 206'' and 208'', the winding of the master relay T'', conductors 210 and 212 and the other terminal $S_2$ of the power supply S.

The circuit for energizing the electromagnet E'', which is completed once the carrier GB reaches the discharging opening 16'' corresponding to the second discharging station $Fd''$, comprises the terminal $W_1$ of the main power supply W, conductors 303, 302 and 302'', poles $U_{22}$ and $U_{12}$ of the relay T'', conductor 300'', the winding of the electromagnet E'', conductors 306'', 306 and 304 and the other terminal $W_2$ of the power supply W.

The modifications in the main energizing circuits consequent on the inclusion of a cut-out device can clearly be followed from Figure 7. Thus, with reference to the preselection of the first discharging station for the carrier GA, from the second loading station, the pole $2L_1$ instead of being connected directly to one end of the coil Va' by conductors $106_1''$, $106_1$, 108', 110' and 110a', is connected to the said end, through the contracts $Ya_{11}$ and $Ya_{21}$ of the set DA of the cut-out device.

It is understood that although the present invention has been described with reference to certain embodiments, the scope thereof is not limited thereto and that various modifications may be made without departing from the scope and nature of the invention as defined in the appended claims.

What is claimed is:

1. A transporter system for despatching articles and the like from any one of a plurality of loading stations to any one of a plurality of discharge stations preselectable at said loading station comprising a conveyor having a plurality of carriers and adapted to move continuously in a closed path past said loading and discharging stations, push-button means located in the proximity of each loading station, unloading means in said carriers, normally inoperative electromagnetically actuated means for operating said unloading means and having an operative and an inoperative position, master relay means for energizing said electromagnetically actuated means to bring the same into operative position, relay means including a maintenance portion and a preselection portion connected with said master relay means so as to preselect responsive to depression of one of said push-button means the individual master relay means to be energized, a change-over device including a rotary element for every discharging station, actuating means carried by each rotary element, normally open primary and secondary contact means operatively associated with each rotary element and adapted to be closed by movement past said contact means of said actuating means, isolation relay means connected in circuit with said maintenance portion and some of said primary contact means, the remainder of said primary contact means being connected in circuit with said push-button means, some of said secondary contact means being connected in circuit with said preselection portion and the remainder of the secondary contact means being connected to a source of electrical energy, and restoring means severally connected in circuit with each isolation relay means and operable by said actuating means to restore to normal position that part of the system electrically associated with a given rotary element on completion thereby of a full revolution.

2. A transporter system for despatching articles and the like from any one of a plurality of loading stations to any one of a plurality of discharge stations preselectable at said loading station comprising a conveyor having a plurality of carriers and adapted to move continuously in a closed path past said loading and discharging stations, push-button means located in the proximity of each loading station, unloading means in said carriers, normally inoperative electromagnetically actuated means for operating said unloading means and having an operative and an inoperative position, master relay means for energizing said electromagnetically actuated means to bring the same into operative position, relay means including a maintenance portion and preselection portion connected with said master relay means so as to preselect responsive to depression of one of said push-button means, the individual master relay means to be energized, a change-over device including a rotary element for every discharging station, actuating means carried by each rotary element, normally open primary and secondary contact means operatively associated with each rotary element and adapted to be closed by movement past said contact means of said actuating means, isolation relay means connected in circuit with said maintenance portion and some of said primary contact means, the remainder of said primary contact means being connected in circuit with said push-button means, some of said secondary contact means being connected in circuit with said preselection portion and the remainder of the secondary contact means being connected to a source of electrical energy, restoring means severally connected in circuit with each isolation relay means and operable by said actuating means to restore to normal position that part of the system electrically associated with a given rotary element on completion thereby of a full revolution and cut-out means connected between said preselection and maintenance relay means to interrupt successively the energizing circuits of said preselection and maintenance relay means.

3. A transporter system for despatching articles and the like from any one of a plurality of loading stations to any one of a plurality of discharge stations preselectable at said loading station comprising a conveyor having a plurality of carriers and adapted to move continuously in a closed path past said loading and discharging stations, push-button means located in the proximity of each loading station, unloading means in said carriers, normally inoperative electromagnetically actuated means for operating said unloading means and having an operative and an inoperative position, master relay means for energizing said electromagnetically actuated means to bring the same into operative position, relay means including a maintenance portion and preselection portion connected with said master relay means so as to preselect responsive to depression of one of said push-button means, the individual master relay means to be energized, a change-over device including a rotary element for every discharging station, actuating means carried by each rotary element, normally open primary and secondary contact means operatively associated with each rotary element and adapted to be closed by movement past said contact means of said actuating means, isolation relay means connected in circuit with said maintenance portion and some of said primary contact means, the remainder of said primary contact means being connected in circuit with said push-button means, some of said secondary contact means being connected in circuit with said preselection portion and the remainder of the secondary contact means being connected to a source of electrical energy, restoring means severally connected in circuit with each isolation relay means and operable by said actuating means to restore to normal position that part of the system electrically associated with a given rotary element on completion thereby of a full revolution, and rotary cut-out means connected between said preselection and maintenance relay means to interrupt successively the energizing circuits of said preselection and maintenance relay means.

4. A transporter system comprising a plurality of loading stations, a plurality of discharging stations, a conveyor having a plurality of carriers and adapted to move continuously in a closed path past said loading and discharging stations, a tiltable platform on each of said conveyors, a tipper arm located in the proximity of each discharging station, an electromagnetically operated device having a coil, one such device being operatively associated with each tipper arm to form a tilting device and to move said tipper arm into the path of said carriers whereby to cause tilting of said platforms, and control means arranged to control the energization of said tilting devices and comprising a change-over device including a rotary element for each carrier, an actuating device carried by each rotary element, a set of double pole push-buttons located in the proximity of each loading station, each set comprising individual buttons assigned to a particular discharging station, one pole of a push-button in every set being connected in parallel with the like pole of the other buttons of the same set to form an actuating group, the other pole of said button being connected in parallel with the like poles of the buttons in the other sets assigned to the same discharging station to form a call group, a primary and a secondary set of pairs of normally open contacts operatively associated with each rotary element, said pairs of contacts being adapted to be closed temporarily by movement past them of said actuating means, each pair of primary contacts in a set being assigned to a different loading station and each pair of secondary contacts in a set being assigned to a different discharging station, one contact of each primary pair being connected in parallel with the corresponding contacts of the other pairs of the same set to form a carrier identifying group, the other contact of the pair being connected in parallel with the corresponding contacts of those primary pairs of the other sets which are assigned to the same loading station, to form a loading group connected to the actuating group of the same loading station, one contact of each secondary pair being connected in parallel with the like contacts of the other pairs of the same secondary set to form a carrier selection group, the other contact of each secondary pair being ungrouped, the carrier selection groups being connected in parallel to one pole of a first source of electric energy, an isolation relay for each rotary element, having a coil and a pair of normally closed contacts connected in series between one end of said coil and the carrier identifying group associated with the same rotary element, the other end of said coil being connected to a pole of a second source of electric energy, one for each isolation relay, a set of preselection and maintenance relays electrically associated with each isolation relay, each preselection and maintenance relay of a set corresponding to a given discharging station and each having a coil and a pair of normally open preselection contacts and a pair of normally open maintenance contacts, one contact of each pair of maintenance contacts being connected in parallel with the like contacts of the other preselection and maintenance relays of each set to form a maintenance group, said maintenance group being connected in parallel with the coil of the respective isolation relay, the other maintenance contact of the pair being connected in series with the coil of the respective preselection and maintenance relay, one contact of each pair of preselection contacts being connected to the ungrouped contact of the secondary pair associated with the same discharging station and forming part of the secondary set associated with that primary set, the carrier identifying group of which is connected to a contact of the respective isolation relay, the other preselection contact of said pair being connected in parallel with the like contacts of the other preselection and maintenance relays corresponding to the same discharging station, to form master control groups each group corresponding to a specific discharging station, that end of the coil of a preselection and maintenance relay which is connected to a maintenance contact being also connected in parallel with the like ends of the coils of the other preselection and maintenance relays corresponding to the same discharge station to the call group for the same discharge station, the other ends of the coils of all the preselection and maintenance relays of a set being connected in parallel to another pole of the corresponding second source of electrical energy, a master relay for each discharging station having a coil and a pair of normally open contacts, one of said contacts being connected in parallel with the like contacts of the other master relays to one pole of a third source of electric energy, like ends of the coils of said master relays being connected in parallel to another pole of said first source of electrical energy, the other ends of said coils being connected each to a different master control group, the other contact of each master relay being connected to one end of the coil of one of the said tilting devices, the other end of said tilting device coil being connected in parallel with the other ends of the other tilting device coils to another pole of said third source of electrical energy, and restoring means connected in series with the coil of each isolation relay and operative on completion of the cycle of travel of any one carrier to restore to normal the electrical part of the system associated with said isolation relay.

5. A transporter system comprising a plurality of loading stations, a plurality of discharging stations, a conveyor having a plurality of carriers and adapted to move continuously in a closed path past said loading and discharging stations, a tiltable platform on each of said conveyors, a tipper arm located in the proximity of each discharging station, an electromagnetically operated device having a coil, one such device being operatively associated with each tipper arm to form a tilting device and to move said tipper arm into the path of said carriers whereby to cause tilting of said platforms, and control means arranged to control the energization of said tilting devices and comprising a change-over device including a rotary element for each carrier, an actuating device carried by each rotary element, a set of double pole push-buttons located in the proximity of each loading station, each set comprising individual buttons assigned to a particular discharging station, one pole of a push-button in every set being connected in parallel with the like pole of the other buttons of the same set to form an actuating group the other pole of said button being connected in parallel with the like poles of the buttons in the other sets assigned to the same discharging station to form a call group, a primary and a secondary set of pairs of normally open contacts operatively associated with each rotary element, said pairs of contacts being adapted to be closed temporarily by movement past them of said actuating means, each pair of primary contacts in a set being assigned to a different loading station and each pair of secondary contacts in a set being assigned to a different discharging station, one contact of each primary pair being connected in parallel with the corresponding contacts of the other pairs of the same set to form a carrier identifying group, the other contact of the pair being connected in parallel with the corresponding contacts of those primary pairs of the other sets which are assigned to the same loading station, to form a loading group connected to the actuating group of the same loading station, one contact of each secondary pair being connected in parallel with the like contacts of the other pairs of the same secondary set to form a carrier selection group, the other contact of each secondary pair being ungrouped, the carrier selection groups being connected in parallel to one pole of a first source of electric energy, an isolation relay for each rotary element, having a coil and a pair of normally closed contacts connected in series between one end of said coil and the carrier identifying group associated with the same rotary element, the other end of said coil being connected to a pole of a second source of electric energy, one for each isolation relay, a set of preselection and maintenance relays electrically associated with each isolation relay, each preselection and maintenance relay of a set corresponding to a given discharging station and each having a coil and a pair of normally open preselection contacts and a pair of normally open maintenance contacts, one contact of each pair of maintenance contacts being connected in parallel with the like contacts of the other preselection and maintenance relays of each set to form a maintenance group, said maintenance group being connected in parallel with the coil of the respective isolation relay, the other maintenance contact of the pair being connected in series with the coil of the respective preselection and maintenance relay, one contact of each pair of preselection contacts being connected to the ungrouped contact of the secondary pair associated with the same discharging station and forming part of the secondary set associated with that primary set, the carrier identifying group of which is connected to a contact of the respective isolation relay, the other preselection contact of said pair being connected in parallel with the like contacts of the other preselection and maintenance relays corresponding to the same discharging station, to form master control groups each group corresponding to a specific discharging station, the ends of the coil of a preselection and maintenance relay remote from the maintenance contact thereof being connected in parallel with the like ends of the coils of all the preselection and maintenance relays of a set to another pole of the corresponding second source of electrical energy, a master relay for each discharging station having a coil and a pair of normally open contacts, one of said contacts being connected in parallel with the like contacts of the other master relays to one pole of a third source of electric energy, like ends of the coils of said master relays being connected in parallel to another pole of said first source of electrical energy, the other ends of said coils being connected each to a different master control group, the other contact of each master relay being connected to one end of the coil of one of the said tilting devices, the other end of said tilting device coil being connected in parallel with the other ends of the other tilting device coils to another pole of said third source of electrical energy, restoring means connected in series with the coil of each isolation relay and operable by said actuating means to restore to normal position that electrical part of the system associated with any one rotary element on completion of each full rotation of said element and cut-out means comprising a rotary member having an actuating means, a plurality of sets of pairs of normally open cut-out contacts, each set corresponding to a set of preselection and maintenance relay coils, a bridge-member operatively associated with each pair of cut-out contacts, the bridge-members of a set being mechanically coupled to- and electrically insulated from each other to form cut-out assemblies adapted to be moved successively into contact bridging position by movement past said assemblies of said actuating means, one cut-out contact of each pair being connected to a different preselection and maintenance relay coil of the corresponding set at that end of said relay coil which is connected to a maintenance contact, and the other cut-out contact of the pair being connected in parallel with the other cut-out contacts of like pairs of the other sets to the actuating group for the corresponding preselection and maintenance relays.

CARLOS FISCHBACH.
JOSE ENQUIN.
JOSÉ LUIS SIDLER.